(12) United States Patent
Moorer

(10) Patent No.: US 7,325,921 B1
(45) Date of Patent: Feb. 5, 2008

(54) DEVICE TO HOLD FACE-WORN EYEWEAR WHEN NOT IN USE

(76) Inventor: Rubie L. Moorer, 3587 W. Sanilac Rd., Vassar, MI (US) 48768

( * ) Notice: Subject to any disclaimer, the term of this patent is extended or adjusted under 35 U.S.C. 154(b) by 34 days.

(21) Appl. No.: 11/488,225

(22) Filed: Jul. 18, 2006

(51) Int. Cl.
*G02C 1/00* (2006.01)
*A45F 5/00* (2006.01)

(52) U.S. Cl. .................. 351/158; 24/3.3; 224/250; 224/602

(58) Field of Classification Search .......... 351/41, 351/158; 224/250, 602, 224, 161, 203, 205, 224/210, 235, 261, 270, 576, 3.3, 3.7, 3.8
See application file for complete search history.

(56) References Cited

U.S. PATENT DOCUMENTS

| | | | |
|---|---|---|---|
| 104,216 A | 6/1870 | Sickels | |
| 3,931,917 A * | 1/1976 | Zellmer | 224/602 |
| D282,548 S | 2/1986 | Shells | |
| 4,699,401 A * | 10/1987 | Saenz | 280/808 |
| 4,938,581 A | 7/1990 | Trickel | |
| 5,305,934 A | 4/1994 | Grey | |
| 5,367,347 A | 11/1994 | Wilson | |
| 6,070,303 A | 6/2000 | Macy et al. | |
| 6,644,527 B1 * | 11/2003 | Karenga | 224/602 |

OTHER PUBLICATIONS www.naturesjewelry.com / Sun Eyeglass Hanger Pin.
www.naturesjewelry.com / Glass Beaded Eyeglass Chain.
www.currentcatalog.com / Eyeglasses Holder.
2002 Beaut Boutique Mail Order Catalog / Eyeglass Holder and Brooch.

* cited by examiner

*Primary Examiner*—Hung X. Dang
(74) *Attorney, Agent, or Firm*—Lawrence J. Gibney

(57) ABSTRACT

The present invention is a strap that holds eyewear in storage through two methods. In one method, a portion of the eyewear is inserted through parallel slots. In another method, the nosepiece is secured over a loop. The strap may be worn around the neck or used as a strap for a bag.

3 Claims, 4 Drawing Sheets

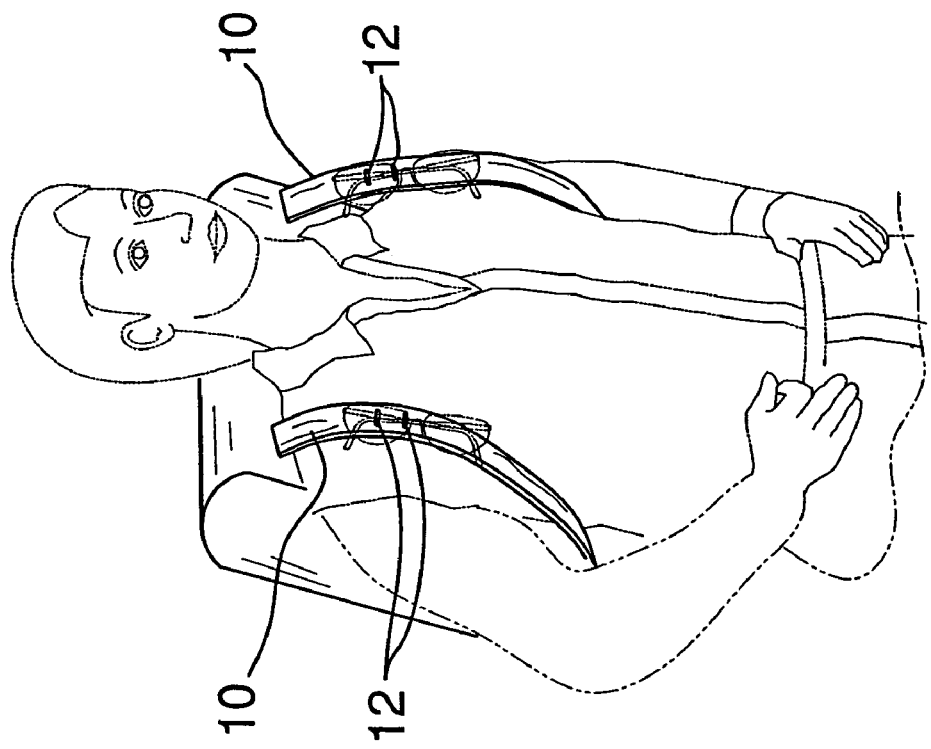
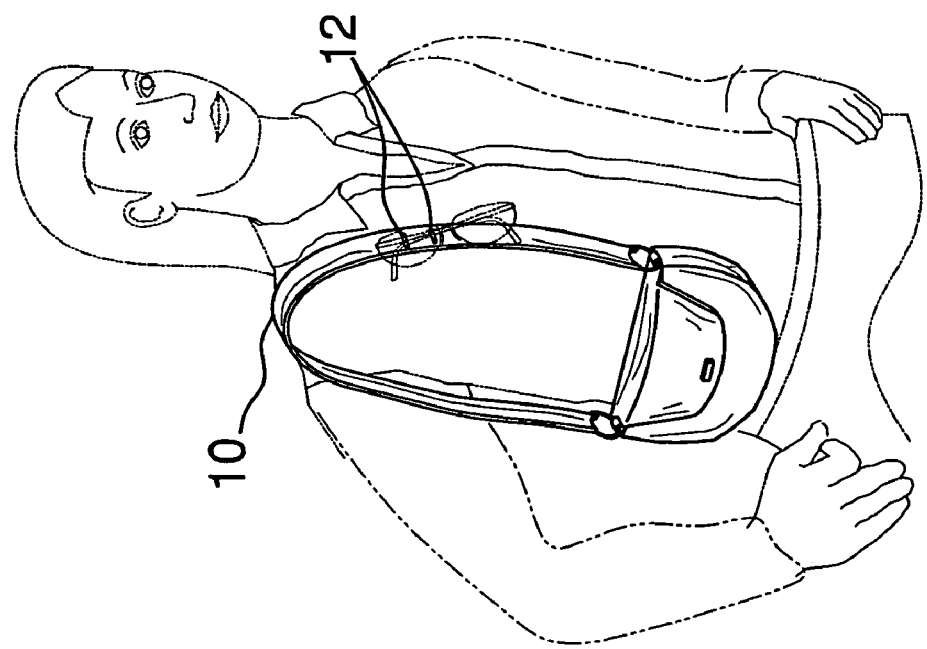

DEVICE TO HOLD FACE-WORN EYEWEAR WHEN NOT IN USE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Wearers of spectacles or sunglasses often do not wish to keep them on their face all of the time. However, such items are often misplaced or broken when not being worn. A device is needed which provides a comfortable and secure location for storing eyewear. Although eyewear is specifically mentioned this device can also be used around the waist to store small items.

A. Field of the Invention

The present invention relates to the holding and storing of eyewear not currently in use. More specifically, it relates to the practical and secure storage of eyewear for a user.

B. Prior Art

Prior art exists which allows for storage of eyewear around the neck of the user. Trickel U.S. Pat. No. 4,938,581, Sickels U.S. Pat. No. 104,216 and Grey U.S. Pat. No. 5,305,934 each are examples of this. However, nothing exists which provides for more than one location for the storage of eyewear. Additionally, nothing in the prior art provides for more than one method of storing eyewear.

BRIEF SUMMARY OF THE INVENTION

The present invention provides a practical way to store small objects, specifically face-worn eyewear. The present invention is a strap with a pair of parallel slots through which objects may be inserted and secured. The present invention allows for the storage of more than one object, specifically eyewear, simultaneously and through different methods.

Another method is through a hook at the base in which the eyewear will securely rest between the bridge of the eyewear. This device can also be used to store small items that are commonly found in purses. It is not the location that is critical but the method to store items that are commonly misplaced. The items are not necessarily limited to eyewear but small items that are found in pocketbooks or purses as well.

BRIEF DESCRIPTION OF THE DRAWINGS

FIG. 4 is a view of the alternate embodiment when in use as a strap of a purse.

FIG. 5 is a view of the alternate embodiment when in use as backpack straps.

DETAILED DESCRIPTION OF THE EMBODIMENT

Figure 1:
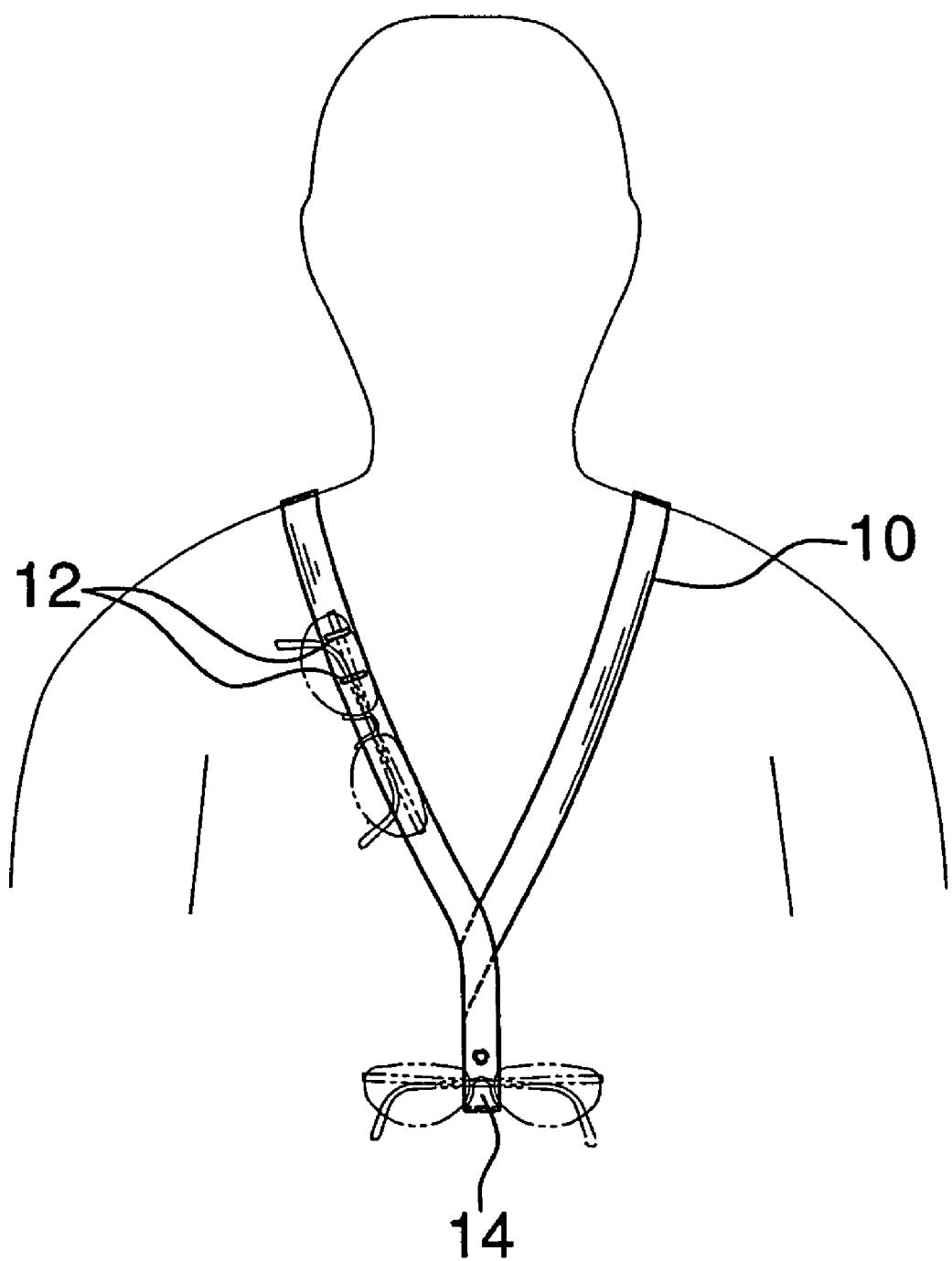
FIG. 1 is a view of the device in use around the user's neck showing placement of the eyewear through the slots near the person's shoulder and also through the loop assembly in front of the person's chest.

The present invention consists of an elongated strap 10. The strap 10 is basically flat and can be manufactured from a variety of material if desired. The strap 10 has two ends. There are parallel slots 12 at desired locations along the strap 10. The temple or bar of the eyeglasses that extends from the lens frame around the ear on the eyewear is inserted through the slots 12 so that they are secured in place. FIG. 1, 3 This strap 10 may be used in several different embodiments or devices to securely hold eyewear or other small objects.

First Embodiment

Figure 3:
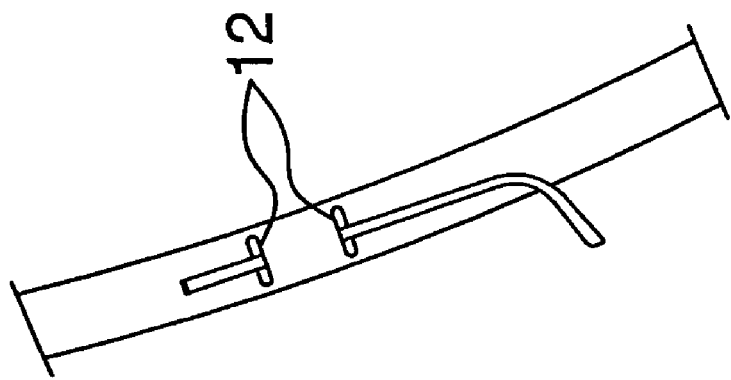
FIG. 3 is an enlarged view of the slots within the device with one of the bars on the eyeglasses through a slot.
Figure 2:
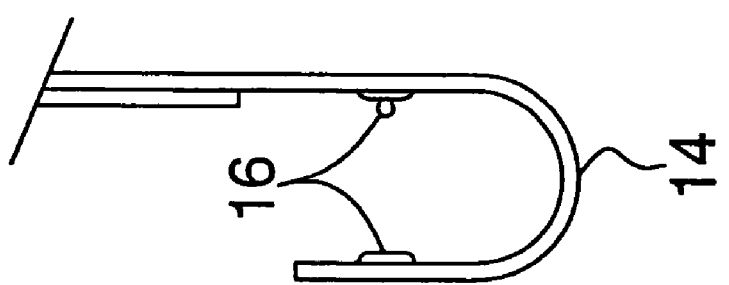
FIG. 2 is a side view of the loop on the device.
Figure 6:
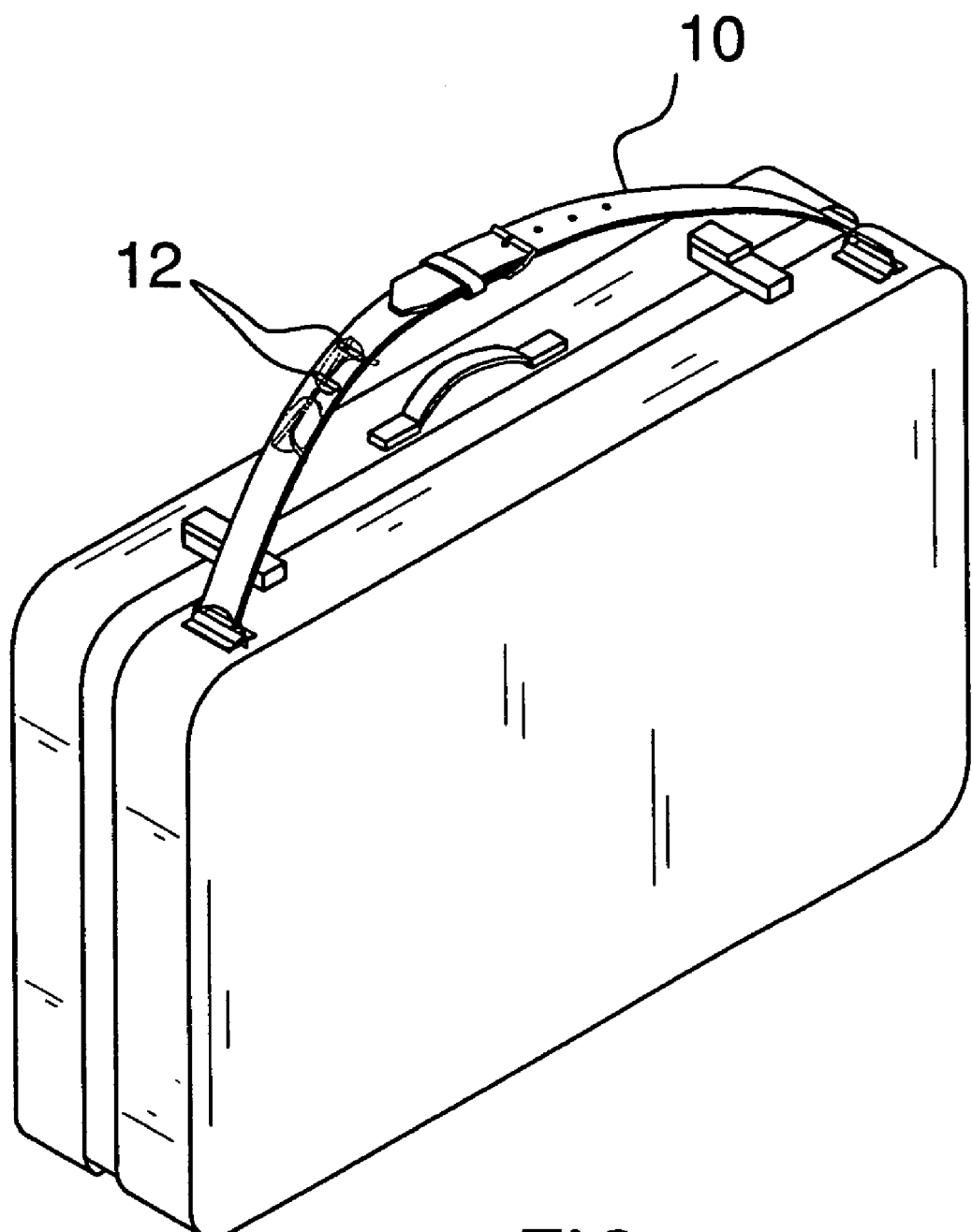
FIG. 6 is a view of the alternate embodiment when in use as a shoulder strap for a bag.

A loop of material is formed so that the individual can insert his/her head through the loop. FIG. 1 Along the shoulder are of the person will be material with slots 12 through which a portion of the eyewear may be inserted. FIG. 3 The remaining excess of the second end beyond the connection point of the loop with the first end has a securing device 16. FIG. 2 The securing device 16 which can be a snap and button or hook and loop assembly, is used to hold eyewear in front of the person when using the loop 14. The loop 14 is inserted between the bridge on the eyewear and the securing device 16 is closed. In this embodiment the eyewear can be inserted through the slots 12 or the loop 14 of the device as desired by the user. FIG. 1

Second Embodiment

The strap 10 is used as a shoulder strap for a bag. In the second embodiment the slots are used to store the eyewear. A tunnel is formed in the strap to allow the inserting of the temple within the tunnel. FIG. 3 The two ends of the strap 10 are secured to the bag and eyeglasses are inserted through the slots 12 located on the strap 10. FIG. 3 Such a bag that may be used are a purse, a backpack, or a briefcase. FIG. 4, 5, 6

Because the straps can be changed between a purse, pocket book, backpack or luggage, this device is easily interchangeable.

The cloth to make the strap will be flexible material. Many choices of such material are available. Additionally the slots on the strap would be positioned approximately two to four inches apart to form the appropriate tunnel through which the piece of eyewear will be inserted. A pair of slots is used to store the eyewear and are incorporated into the strap. A tunnel is provided between the two slots to provide a means to allow the eyewear to be inserted into the device and secured to the strap.

The invention claimed is:

1. A device for securing and storing face-worn eyewear comprised of:
   a. a strap;
   wherein said strap is of a flexible material;
   wherein said strap is flat;
   wherein said strap has a first end and a second end;
   wherein slots are provided in the strap;
   b. slots;

wherein the slots are positioned parallel to each other;
wherein said slots are spaced apart a distance of between 2 and 4 inches;
wherein said slots are incorporated into a desired location on the strap;
wherein each pair of slots is connected through a tunnel device within the strap;
   c. loop;
wherein a loop is formed at one end of the device;
wherein a connection means is provided on the loop.

2. A method of storing eyewear using the device as described in claim 1 wherein the user inserts the eyewear through one slot, pushes it through the connection tunnel, and out the other slot.

3. A method of storing eyewear using the device as described in claim 1 wherein the user places the nosepiece of the eyewear on the loop and fixedly secures the locking mechanism.

* * * * *